Figure 1:
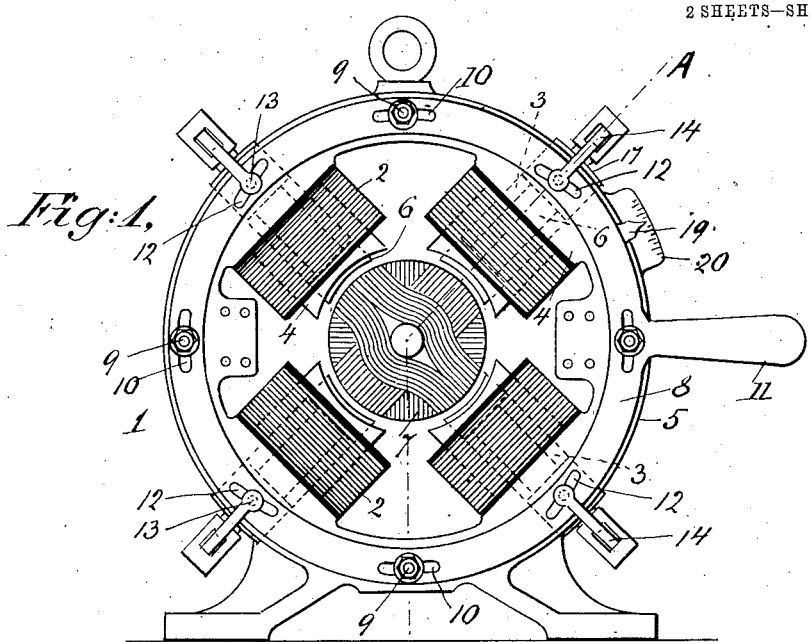

No. 859,826. PATENTED JULY 9, 1907.
G. MARTINKA.
VARIABLE SPEED MOTOR.
APPLICATION FILED JULY 17, 1906.

2 SHEETS—SHEET 1.

WITNESSES

INVENTOR
George Martinka,
BY Edgar Tate & Co
ATTORNEYS

No. 859,826. PATENTED JULY 9, 1907.
G. MARTINKA.
VARIABLE SPEED MOTOR.
APPLICATION FILED JULY 17, 1906.
2 SHEETS—SHEET 2.
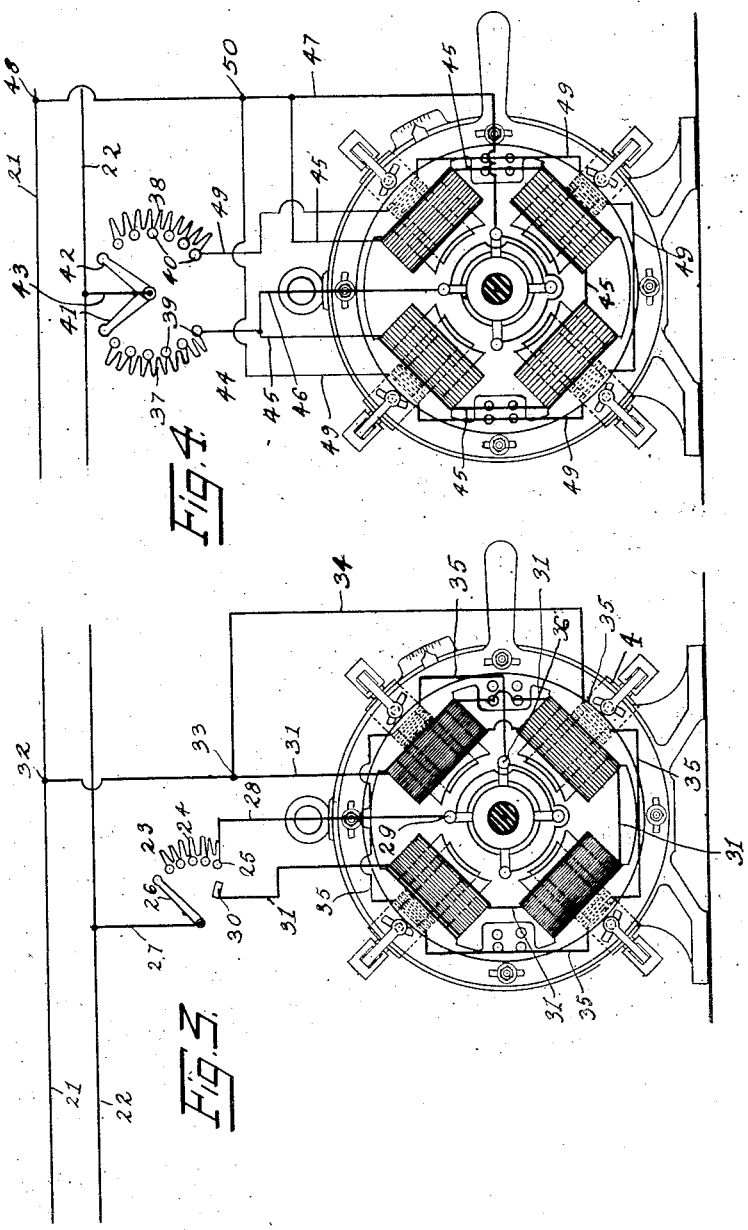
WITNESSES
Albert W. Gibbs.
B. E. Mulreany
INVENTOR
George Martinka
BY
Edgar Tate & Co
ATTORNEYS ated July 9, 1907.

UNITED STATES PATENT OFFICE.

GEORGE MARTINKA, OF JERSEY CITY, NEW JERSEY.

VARIABLE-SPEED MOTOR.

No. 859,826.

Specification of Letters Patent.

Patented July 9, 1907.

Application filed July 17, 1906. Serial No. 326,592.

*To all whom it may concern:*

Be it known that I, GEORGE MARTINKA, a subject of the Emperor of Austria, residing at Jersey City, in the county of Hudson and State of New Jersey, have invented certain new and useful Improvements in Variable-Speed Motors, of which the following is a specification, such as will enable those skilled in the art to which it appertains to make and use the same.

This invention relates to electrical generators and motors and is more particularly designed as an improvement on variable speed motors; and the object of my invention is to effect an easy adjustment of the variable speed necessary on such motors as are usually employed in direct connected electrically driven machinery, and another object being to provide means of mechanically adjusting the number of revolutions of a generator subject to the variable load carried thereby.

The invention is fully disclosed in the following specification, of which the accompanying drawing forms a part, in which the separate parts of my improvement are designated by suitable reference characters in each of the views, and in which;—

Figure 2:
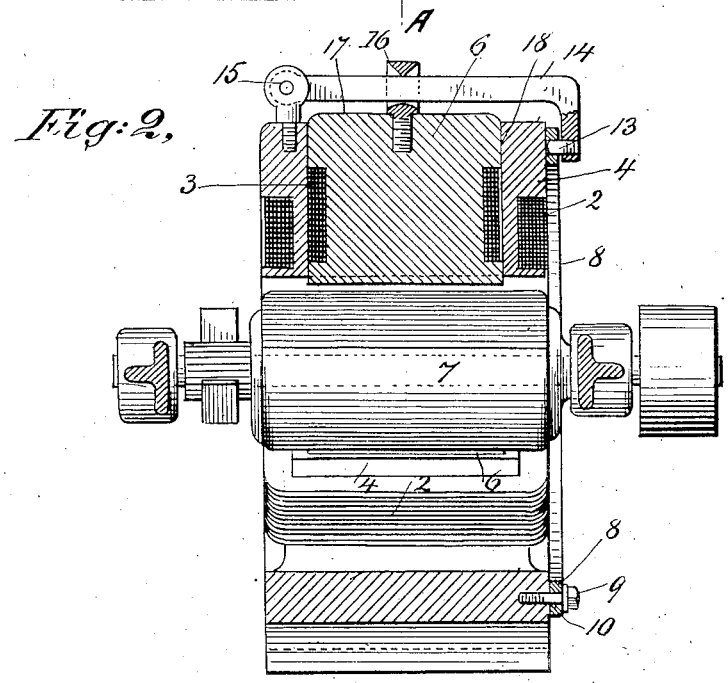

Figure 1 shows a four-pole generator or motor, the shaft bearing being removed in order to expose the mechanism of my invention more clearly; and, Fig. 2 is a vertical sectional view of Fig. 1 on the line A—A. Fig. 3 a view similar to Fig. 1 but showing or indicating one method of wiring my improved generator or motor as a compound series and shunt motor or generator; Fig. 4 a similar view showing or indicating a method of wiring my improved motor or generator in what is known as a shunt wound parallel motor or generator.

In the drawing 1 is a four-pole generator or motor, each of the poles thereof being provided with shunt winding 2 and series winding 3, and as shown in the drawing the magnet cores 4 for the shunt winding are stationary with the yoke 5. The series windings are placed on a core 6, which latter are inserted into the outer cores 4 and are slidable therein, and the combined magnet field of both the stationary as well as the movable poles furnish the magnetic lines for the armature 7.

It is designed to increase or decrease at the will of the operator, the air gap between the armature and the faces of the movable pole pieces and thereby exert more or less restraining magnetic forces upon the armature and obtain thereby a consequent decrease or increase in speed of the motor, and this, I accomplish by the partial rotation of an annular ring 8 which is preferably placed on the face of the yoke 5 nearest to the pulley end of the motor. This ring 8 is concentrically placed to the armature and held in operative position by means of the screws 9, which pass through slots 10 into the yoke 5, these slots 10 are also concentric with the axis of the armature shaft. A handle 11 on the annular ring 8 will facilitate the rotation of the same, which rotation is limited by the extent of the lengths of the slots 10. Slots 12 of lengths corresponding to those of the slots 10 are also provided within the annular ring 8 but they are each inclined to the circumference of the same, and a pin 13 placed therein will, upon partial rotation of the ring 8, be actuated upon by the inclined slots 12 in the manner of a cam and receive thereby radially reciprocatory motion. One of such inclined slots 12 is placed opposite and centrally to each of the movable magnet cores 6, and each of these cores and their respective pole pieces can be readily moved by means of said pin 13, which latter forms the inner projection of a one arm lever 14 which is pivoted at 15 and which passes through the bearing pin 16. The latter is screwed into the outer projecting end 17 of the movable magnet core 6, and by means of this combination of movable ring 8, pins 13 of the pivoted levers 14 all the movable cores can be simultaneously withdrawn or entered into the receiving opening 18 of the stationary cores 4, the extent of such reciprocating motion being limited by the extent of the cam shaped slots 12.

The pointer 19 is fastened to the outer circumference of the movable annular ring 8 at any convenient place and a graduated plate 20 fastened to the stationary yoke 5 will give means of marking thereon, a scale which indicates the number of revolutions made by the motor under the conditions of the varying air gap distances between the movable magnet fields 6 and the armature 7.

In Fig. 3, I have shown at 21 and 22 the wires of a main line or circuit and at 23 I have shown an ordinary starter involving ordinary resistance coils 24 having the usual contact points 25 together with a switch or starter arm 26. The starter arm 26 is connected with the wire 22 by a wire 27, and connected with the coils 24 is a wire 28 which is connected with the commutator of the armature of the motor or generator in the usual manner as shown at 29. A contact point or post 30 is located adjacent to the armature coils 24 and connected therewith is a wire 31 which is successively connected, in the usual manner, with the coils of the main or stationary parts of the field or pole magnets from the last of which it is carried to and connected with the main line or circuit wire 21 at 32. Connected with the wire 31 at 33 is another wire 34 which is successively connected with the movable cores 4 of the field or pole magnets beginning at 35 after which it is carried and connected with the commutator of the armature as shown at 36.

It will be understood that the arm 26 operates in connection with the contact device or post 30 as well as in connection with the contact points 25 of the coils 24, and the method of operation will be readily understood by all those familiar with this class of devices.

In Fig. 4 a double starter or starting box is employed, comprising similar coils 37 and 38 having contact points 39 and 40 and two pivoted arms 41 and 42 connected with the wire 22 as shown at 43. Connected with one of the contact points of the coil 37 is a wire 44 which has two branch wires 45 and 46, the last of which connects with the commutator of the armature and the first of which is successively connected with the outer stationary parts of the field or pole magnets as clearly shown after which it is connected with a wire 47 which is connected with the commutator and with the main circuit wire 21 at 48. Connected with one of the contact points 40 of the coils 38 is a wire 49, which is successively connected with the inner movable cores of the field or pole magnets, after which it is connected with the wire 47 at 49. In starting a motor or generator constructed and wired in this manner, the coils 37 are first thrown into circuit by means of the adjacent arm 41 which operation connects the armature and the outer portion of the field or pole magnets in shunt, and when the generator or motor has thus been put in operation the central movable cores of the field or pole magnets may be thrown into action or energized by means of the coil 38 and the adjacent arm 42.

It is obvious that this mechanism can be applied to motors and generators, other than shunt-and-series wound, such as to series machines, in which case the series windings take place on the outer magnet cores, while the windings on the inner cores are dispensed with and solid cores containing magnetic properties take their places.

Having fully described my invention, what I claim as new and desire to secure by Letters Patent, is:—

1. A variable speed electric motor provided with stationary pole pieces and radially movable pole pieces placed in the stationary pole pieces one of said pole pieces being provided with shunt and the other with series winding.

2. A variable speed electric motor provided with stationary pole pieces and radially movable pole pieces placed in the stationary pole pieces one of said pole pieces being provided with shunt and the other with series winding, and means for reciprocating the radially movable pole piece.

3. An electric variable speed motor having radially movable pole pieces mounted in permanently fixed pole pieces, the permanently fixed pole pieces being provided with shunt winding and the radially movable pole pieces with series winding, and means for reciprocating the radially movable pole pieces.

In testimony that I claim the foregoing as my invention I have signed my name in presence of the subscribing witnesses this 14th day of July 1906.

GEORGE MARTINKA.

Witnesses:
F. A. STEWART,
C. J. KLEIN.